UNITED STATES PATENT OFFICE.

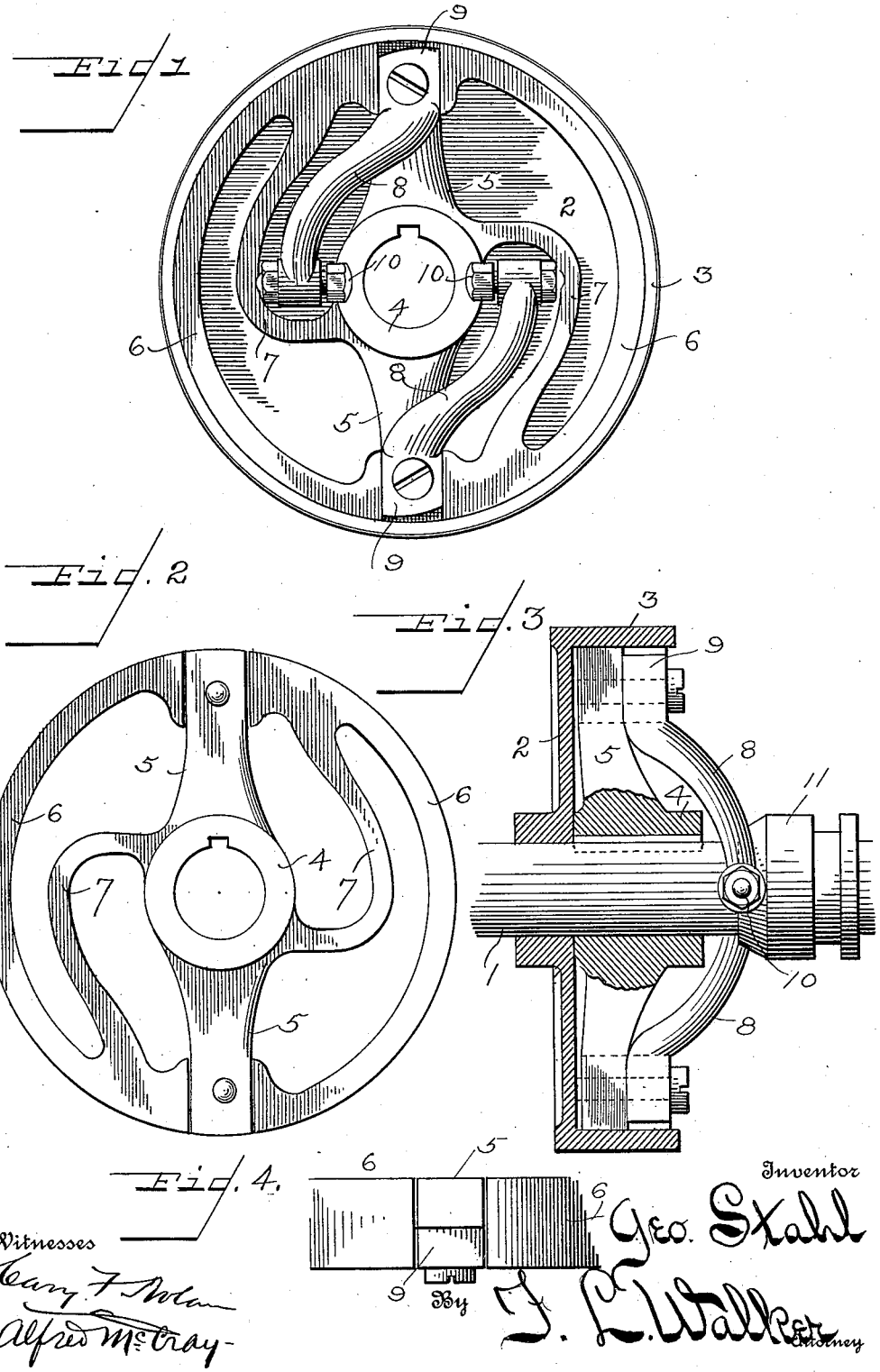

GEORGE STAHL, OF DAYTON, OHIO, ASSIGNOR TO THE EDGEMONT MACHINE COMPANY, OF DAYTON, OHIO, A CORPORATION OF OHIO.

FRICTION-CLUTCH.

1,085,765.  Specification of Letters Patent.  Patented Feb. 3, 1914.

Application filed October 3, 1911. Serial No. 652,645.

*To all whom it may concern:*

Be it known that I, GEORGE STAHL, a citizen of the United States, residing at Dayton, in the county of Montgomery and State of Ohio, have invented certain new and useful Improvements in Friction-Clutches, of which the following is a specification.

My invention relates to clutches and particularly to friction clutches adapted to connect a driving and a driven member, which members may comprise a shaft and a pulley or two shafts but which is especially adapted to connect a normally loose pulley with a drive shaft upon which the pulley is loosely mounted.

The object of the invention is to simplify the structure as well as the means and mode of operation of such devices whereby they will not only be cheapened in construction but will be more efficient in use, easily and quickly operated, positive in action and unlikely to get out of repair.

A further object of the invention is to provide a clutch embodying a maximum friction surface and which will require a minimum effort to cause the engagement or setting of the clutch.

With the above primary and other incidental objects in view as will more fully appear in the specification, the invention consists of the features of construction, the parts and combinations thereof and the mode of operation or their equivalents as hereinafter described and set forth in the claims.

In the accompanying drawing, Figure 1 is a side elevation of the clutch and pulley removed from the shaft, the operating cone being omitted. Fig. 2 is a side elevation of the clutch member removed from the pulley and viewed from the side opposite that disclosed in Fig. 1. Fig. 3 is a sectional view of the clutch and pulley in assembled relation. Fig. 4 is a detail plan view of a portion of the clutch member viewed from the top or bottom in Fig. 2.

Like parts are indicated by similar characters of reference throughout the several views.

In the drawing, 1 is the shaft upon which is loosely mounted a pulley comprising a web portion 2 and the annular flange 3 projecting laterally from the web 2. Keyed or otherwise secured upon the drive shaft 1 and within the annular flange 3 of the driven pulley is the clutch member which is adapted to be frictionally engaged with the interior surface of the annular flange 3. The clutch member comprises a hub 4 from which projects two radial integral arms or spokes 5. Located at the opposite sides of the radial arms 5 are arcuate or segmental friction members 6, the curvature of which corresponds with that of the interior of the annular flange 3 of the driven pulley. These arcuate or segmental friction members 6 are separated from the radial arms 5 by an intervening space whereby they are entirely independent of said radial arms. The arcuate or segmental friction members 6, however, are connected with the hub 4 by curved resilient or spring arms 7. Through the resiliency of the spring arms 7 the segmental friction member 6 may be adjusted to and from the radial arm 5 against the tension of said arm 7. As clearly shown in Fig. 4 the extremity of the radial arms 5 are of less thickness than the width of the segmental friction members 6. Pivotally connected with the extremities of the radial arms 5, intermediate the ends of the frictional members 6, are adjusting arms 8, the ends 9 of which extend between and bear simultaneously upon the adjacent ends of the segmental frictional members 6. This is best shown in Fig. 1. The free ends of the adjusting arms 8 are provided with adjustable contact studs 10, the heads of which are adapted to engage a cone 11 slidingly mounted upon the shaft 1. The cone 11 may be slidingly operated upon the shaft 1 by any suitable shift mechanism. Upon the movement of the cone 11 toward the clutch member the said cone will engage the head of the contact studs 10, and thereby oscillate the adjusting arms 8, whereby the heads of said arms will be caused to exert a camlike action upon the adjacent ends of the friction members 6, thereby forcing said friction members 6 apart and outward into engagement with the interior surface of the annular flange 3 of the driven pulley. This outward movement of the segmental frictional members is accomplished against tension of the resilient arms 7, which are thereby placed under tension and upon the withdrawal of the cone 11 from engagement with the adjusting arm 8 will return the segmental frictional members 6 to their normal position and out of engagement with the interior surface of the flange 3. While in the drawing the clutch has been shown as comprising but two segmental frictional members, it is obvious that three or more segmental frictional members might be employed, particularly in the construction of clutches of very large size, it being understood that the radial arms are increased in number to correspond with the segmental frictional surfaces. It will be seen that by this construction a maximum frictional surface is provided, equaling almost the entire periphery of the clutch member. Furthermore the spring arm 7 being placed under tension when the segmental frictional members are engaged with the pulley, these arms will serve to instantly disengage the frictional members and release the pulley upon the disengagement of the cone 11 from the adjustment arms 8.

The arms 5 in addition to forming supports for the adjusting arms 8 form abutments which resist any tendency toward circumferential displacement of the contact members in relation to the hub when subjected to torsional strain. These arms thereby form a rigid driving connection between the contact members and the hub.

From the above description it will be apparent that there is thus provided a friction clutch of the character described possessing the particular features of advantage before enumerated as desirable, but which obviously is susceptible of modification in its form, proportion, detailed construction and arrangements of parts, without departing from the principles involved or sacrificing any of its advantages, and it is to be understood that the invention is not limited to the particular form shown and described but that the means and mechanism herein described represent but one mode of putting the invention into effect, and the invention is therefore claimed broadly in any of its possible forms or modifications within the scope of the appended claims.

Having thus described my invention I claim;

1. In a friction clutch, a shaft, a member loosely journaled upon the shaft, a clutch member adapted to operatively connect the loose member and the shaft comprising an annular rim divided into independent segmental frictional contact members, a hub carried upon the shaft, resilient arms connecting the contact members to the hub, rigid driving members fixed in their relation with the shaft, through which torque is transmitted between the contact members and the hub and means to move the contact-members into engagement with the loose member against the tension of the resilient arms.

2. In a friction clutch, a shaft, a member loosely journaled upon the shaft, a clutch member adapted to operatively connect the loose member and the shaft comprising an annular rim divided into independent segmental frictional contact members, a hub carried upon the shaft, rigid radial arms carried by the hub and projecting intermediate successive segmental contact members, through which torque is transmitted between the contact members and hub, and operating members adapted to vary the relation of the contact members to expand the divided rim into engagement with the loose member.

3. In a frictional clutch, a driven member, a driving member comprising a hub, an annular rim divided into a plurality of segmental contact members, radial arms carried by the hub and projecting between the adjacent ends of succeeding contact members, said contact members being independent of the radial arms, resilient arms attached at one end to the hub and at the other to the contact members adjacent to one end thereof leaving the other end of the contact member free, operating levers pivoted upon the radial arms intermediate the adjacent ends of succeeding contact members adapted by their oscillation to force the contact members apart and into frictional engagement with the driven member, substantially as specified.

4. In a friction clutch, a shaft, a member loosely journaled upon the shaft, a clutch member adapted to operatively connect the loose member and the shaft comprising an annular rim divided into independent segmental frictional contact members, a hub carried upon the shaft, rigid radial arms independent of the contact members carried by the hub, operating levers pivoted to said rigid arms and projecting between the adjacent ends of successive contact members and adapted by their oscillation to separate the contact members, thereby expanding the divided rim into engagement with the loose member, said operating levers serving as abutments for the contact members through which the torque is transmitted to the radial arms and thence to the hub.

5. In a friction clutch, a shaft, a member loosely journaled upon the shaft, a clutch member adapted to operatively connect the loose member and the shaft comprising an annular rim divided into independent segmental frictional contact members, a hub carried upon the shaft, flexible connections between the contact members and the hub, rigid driving arms normally independent of the contact members carried by the shaft and adapted to transmit the torque intermediate the shaft and contact members, and means for forcing the contact members into engagement with the loose member against the tension of their flexible connections.

6. In a friction clutch, a shaft, a member loosely journaled upon the shaft, a clutch member adapted to cause the engagement of the shaft and loose member comprising an annular rim divided into a plurality of independent segmental contact members, resilient supports for the several contact members, rigid driving members independent of the contact members through which torque is transmitted between the contact members and the support for said contacts and means for varying the contact members in relation one with the other to vary the divided rim circumferentially.

In testimony whereof, I have hereunto set my hand this 29th day of September, 1911.

GEORGE STAHL.

Witnesses:
 THEODORE C. LINDSEY, Jr.,
 EFFIE B. SHOMO.

Copies of this patent may be obtained for five cents each, by addressing the "Commissioner of Patents, Washington, D. C."